United States Patent

Knoll et al.

[11] Patent Number: 5,549,383
[45] Date of Patent: Aug. 27, 1996

[54] SCREW-TYPE EXTRUSION MACHINE WITH HEATING ELEMENTS

[75] Inventors: Arno Knoll, Stuttgart; Gerhard Weihrich, Illingen; Hans Wobbe, Malmsheim, all of Germany

[73] Assignee: Werner & Pfleiderer, GmbH, Germany

[21] Appl. No.: 782,577

[22] Filed: Oct. 25, 1991

[30] Foreign Application Priority Data

Nov. 3, 1990 [DE] Germany .............. 40 34 989.6

[51] Int. Cl.[6] .............. B01F 15/06; B01F 7/08
[52] U.S. Cl. .............. 366/149; 425/208; 425/204; 219/421; 366/145; 366/146; 366/84
[58] Field of Search .............. 366/149, 144, 366/145, 146, 79–90; 425/208, 204, 205, 209, 378.1; 219/420, 421, 422, 423, 424

[56] References Cited

U.S. PATENT DOCUMENTS

| | | | |
|---|---|---|---|
| 2,090,570 | 8/1937 | Classen | 219/421 |
| 2,541,201 | 2/1951 | Buecken et al. | |
| 2,769,201 | 11/1956 | Lorenian | 425/144 |
| 2,814,472 | 11/1957 | Erdmenger | 259/104 |
| 3,161,756 | 12/1964 | Haverkamp et al. | 219/422 |
| 4,028,027 | 6/1977 | Wörz | 425/204 |
| 4,127,331 | 11/1978 | Herbert et al. | 366/83 |
| 4,415,268 | 11/1983 | Brinkmann et al. | 366/149 |
| 4,649,262 | 3/1987 | Yoshikawa | 425/144 |
| 4,702,695 | 10/1987 | Blanch | 366/83 |

FOREIGN PATENT DOCUMENTS

| | | | |
|---|---|---|---|
| 6800967 | 1/1969 | Germany . | |
| 1937547 | 2/1971 | Germany | 425/204 |
| 2208238 | 8/1973 | Germany | 425/204 |
| 2417067 | 11/1974 | Germany | 29/39 |
| 3023393 | 6/1980 | Germany | 29/1.10 |
| 3010659 | 9/1981 | Germany | 425/204 |

Primary Examiner—David Scherbel
Assistant Examiner—Tony G. Soohoo
Attorney, Agent, or Firm—Laff, Whitesel, Conte & Saret, Ltd.

[57] ABSTRACT

A screw-type extrusion machine has a housing with at least one housing bore, in which a screw shaft is arranged. The housing has outer surfaces, which have a non-constant distance to the wall of the at least one bore. The outer surfaces are provided with heating elements. In order to attain an approximately constant temperature along the circumference of the wall of the at least one bore, heating elements of a different specific heating capacity are arranged sectionally on the outer surfaces of the housing, the heating elements being such formed that the heating temperature at the wall of the at least one bore is approximately constant.

10 Claims, 4 Drawing Sheets

SCREW-TYPE EXTRUSION MACHINE WITH HEATING ELEMENTS

FIELD OF THE INVENTION

The invention relates to a screw-type extrusion machine with a housing, with at least one housing bore, in which a shaft is arranged which is provided with screw elements at least along a part of its length and which has a wall, with outer surfaces of the housing, having a non-constant distance to the wall of the at least one bore, and with electrical resistance heating elements arranged on the outer surfaces.

BACKGROUND OF THE INVENTION

Screw-type extrusion machines are usually heated with heating plates or heating shells, which are arranged on the outer surfaces of the housing of the screw-type extrusion machine and which are provided in their interior with electrical resistance heating elements, which have a constant electrical resistance along their length, the heating elements releasing along their length with a corresponding voltage respectively with a corresponding current a constant specific heating capacity, i.e. a constant heating capacity per surface unit or—related to the circumference of the housing—per circumferential section. Because of the ways, which are different for constructive reasons, and which the heat current must cover from the outer surfaces of the housing to the wall of the bore resp. bores, different temperatures occur at the wall of the bore. The heat transfer from the wall of the bore to the material to be treated thus is not constant along its circumference and possibly along its length.

From the German Utility Model 68 00 967 it is known for a screw-type extrusion machine with an annular cylindrical housing, to provide in the housing ducts for a coolant on the one hand and heating elements on the other hand which are parallel to the axis and concentrically to the axis of the bore. In this special embodiment the temperature is constant at the wall of the bore along its circumference; therefore the above described problem does not occur in that case. Comparable embodiments are known from the Published German Patent Application 24 17 067 and from the U.S. Pat. No. 2 541 201.

From DE 30 23 393 A1 a double-shaft screw-type extrusion machine is known, which has tempering ducts running parallel to the axes of the bores. In the vicinity of the bore saddles these bores are guided into the saddles, in order to attain a uniform tempering of the screw housing despite of the different distances between the 8-shaped wall of the bores and the outer surface of the wear liner.

From the German Utility Model 19 04 371 an electrically heatable press plate is known, which has a uniform temperature along its total surface, and that in particular in its margin, the heating elements being closely arranged in this marginal area.

SUMMARY OF THE INVENTION

It is therefore an object of the invention to embody a screw-type extrusion machine of the generic kind such that despite of the different distances of the outer surfaces of the housing accommodating the heating elements to the wall with the at least one bore an at least approximately constant temperature can be attained along the wall of the bore.

This object is attained in accordance with the invention by heating elements of a different specific heating capacity being sectionally arranged on the outer surfaces of the housing; the heating elements being formed such that the heating temperature at the wall of the at least one bore is approximately constant along its circumference. The basic thought of the invention is to attain an approximately constant course of temperature at the wall of the at least one bore and possibly at least along a part of its length, by supplying more heat in outer surface sections, which together with a corresponding wall section limit a heat current sector of an increased heat resistance, than in other outer surface sections, which limit heat current sectors of a decreased resistance. The specific heating capacity, i.e. the heat supply per surface unit or—related to the cross-section of the housing—per circumferential section is thus formed differently. For the attainment and embodiment of this thought of invention various advantageous forms of embodiment are provided, whereby these embodiments can be applied individually or in combination. In order to canalize more accurately the heat flow through the individual heat current sectors, it may be advantageous when heating elements of adjacent outer surface sections are, separated from each other. The heating elements are accommodated in usual manner in heating plates, the term heating plate not necessarily assuming that they are plane, they can also be heating shells. The latter can—as usual in practical operation—consist of brass, grey cast iron or aluminium bronze according to the required heating temperature.

Further features, advantages and details of the invention will become apparent from the ensuing description of examples of embodiments of the invention taken in conjunction with the drawing.

DESCRIPTION OF THE PREFERRED EMBODIMENTS

Figure 1:
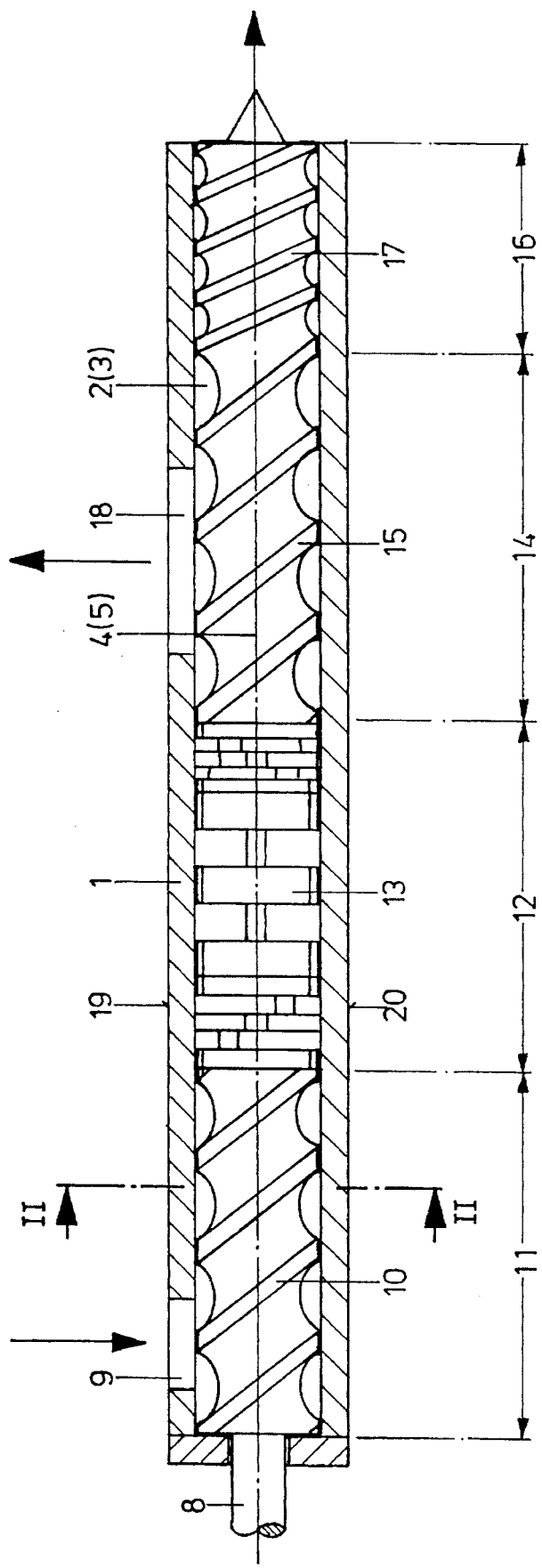
FIG. 1 shows a screw-type extrusion machine in longitudinal section in diagrammatic illustration.
Figure 2:
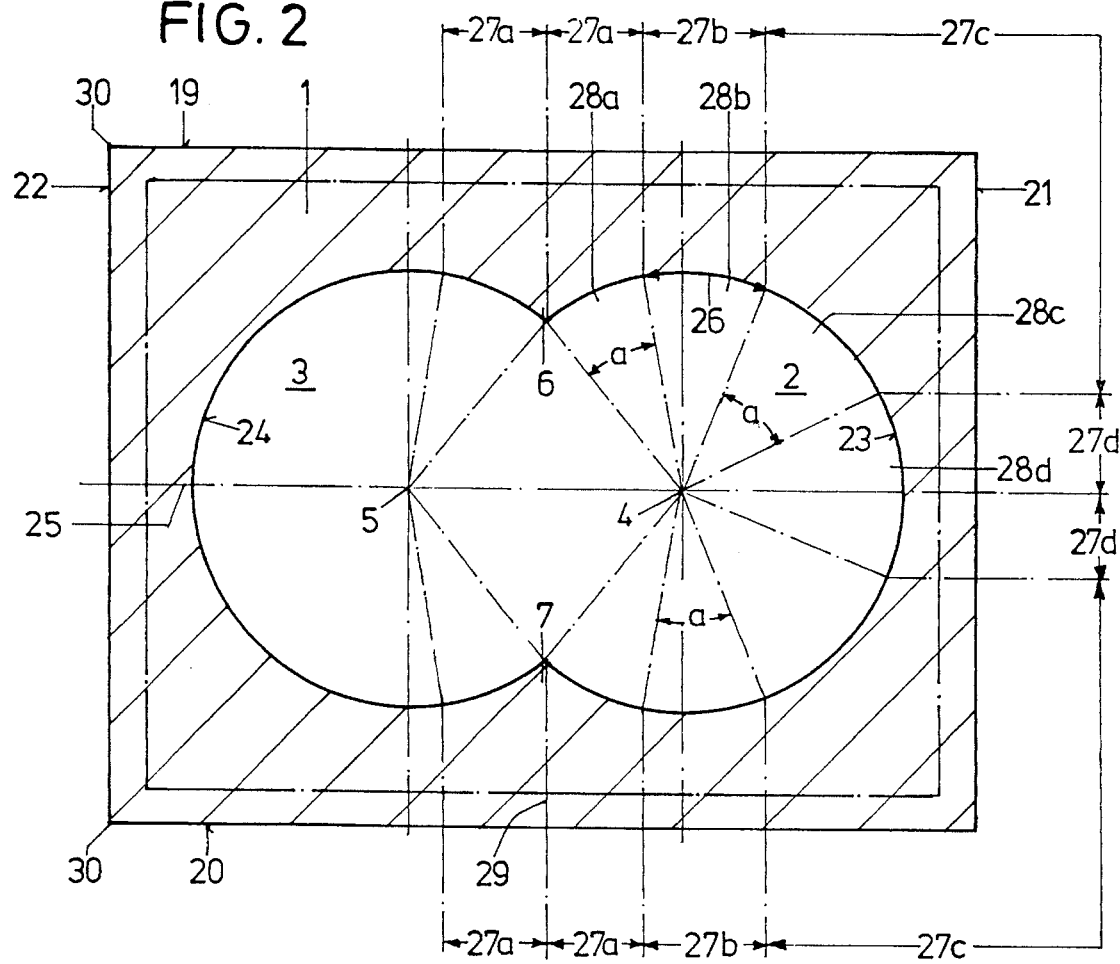
FIG. 2 shows a cross-section according to the line II—II in FIG. 1 through the screw-type extrusion machine.

In FIG. 1 and 2 a double-shaft screw-type extrusion machine is illustrated diagrammatically, comprising a housing 1, in which two bores 2, 3 are arranged, the axes 4, 5 of which run parallel to each other and intersect each other, so that they have approximately the form of an 8 in their cross-section. In the intersection range correspondingly so-called saddles 6, 7 are formed in the housing 1. In each bore 2 or 3 a shaft 8 each is arranged, which is rotationally driveable in usual manner. On each shaft 8 screw elements 10 are arranged, associated to an input opening 9 for the material to be treated, which input opening 9 is arranged at one end of the housing 1. In the feeding zone 11 the material which is put in through the input opening 9 is first drawn in, conveyed and the pressure required for the further processing is produced. Then a plastifying zone 12, in which kneading disks 13 are arranged on each shaft 8, as they are generally known for example from U.S. Pat. No. 2 814 472, follows the feeding zone 11. A homogenization zone 14, in which the molten material is homogenized, follows in turn the plastifying zone 12. On each shaft 8 screw elements 15 are arranged. Finally, a discharge zone 16 follows the homogenization zone 14, in which discharge zone 16 screw elements 17 are arranged on each shaft 8, the screw elements 17 being arranged in a smaller pitch compared to the screw elements 10 and 15, in order to produce the necessary discharge pressure. In the homogenization zone 14 a degasification opening 18 is arranged. The housing 1 has a rectangular cross-section in usual manner—as can be seen in FIG. 2. As far as the screw-type extrusion machine is described up to this point, it is generally known and generally usual in practical operation.

Along the total length of the housing 1 ducts for the guidance of a coolant can be provided in this housing 1. In most cases of application it is necessary to cool the material of which the treatment is accomplished in the discharge zone 16, while it is necessary as a rule to supply the material with heat from outside by heating in the input zone 11 and in the plastifying zone 12. Where and in which amount in detail heat is supplied by heating and where and in which amount cooling is carried out, naturally depends on the desired treatment of the material and on the type of the material itself.

On the outer surfaces 19, 20, 21, 22 of the housing 1 heating plates are arranged, which are described in the following in various forms of embodiment. When these heating plates resp. heating shells—as in prior art—have a constant specific heating capacity per surface unit, based on the distribution of the used heating conductors which have a constant resistance, different temperatures appear at the walls 23, 24 of the bores 2 or 3 along their circumference, i.e. a temperature gradient appears which is directed tangentially to the axis 4 or 5 of the respective bore 2 or 3. The lowest temperature appears in the vicinity of the saddle is 6 or 7. This is caused by the fact that due to the construction different resistivities to heat occur from individual areas of the outer surfaces 19 to 22 to the walls 23 or 24 of the bores 2 or 3, the different resistivities to heat leading to different temperature drops on the way from the corresponding outer surfaces 19 to 22 to the wall 23 or 24 and thus to the mentioned temperature gradients. In addition, differently sized sections of the walls 23 or 24, from which heat is supplied to the material to be treated, are associated to individual sections of the outer surfaces 19 to 22. It is consequently desirable, that the specific heat current from the outer surfaces 19 to 22 of the housing 1 to the walls 23, 24 is constant along the surface of the walls 23, 24 and thus is also constant along given sections along the circumference of the bores 2, 3 in the vicinity of the walls 23, 24. In FIG. 2 circumferential sections 26 each of the same size and thus with the same angle a are illustrated related to the respective axis 4 or 5 of the walls 23 or 24, to which circumferential sections 26 in turn clearly different outer surface sections 27a, 27b, 27c, 27d are associated. The association of these outer surface sections 27a to 27d to the circumferential sections 26 is effected in that manner, that they each limit outside the sectors, through which the heat current flows from such an outer surface section 27a . . . to an inner circumferential section 26. In the example of embodiment four heat current sectors 28a, 28b, 28c, 28d of this kind limited in the described manner are illustrated along a quarter cross-section of the housing 1. Because of the double symmetry of the cross-section of the housing 1 on the one hand to the center plane 25 and on the other hand to the saddle plane 29, running vertically to the center plane 25 and cutting the saddles 6, 7, the corresponding numberings of the outer surface sections and of the heat current sectors are repeated four times. It becomes clearly apparent that particularly small outer surface sections 27a are associated to the heat current sectors 28a which are associated to the saddles 6, 7, that in this case a high specific heating capacity is necessary. This is correspondingly valid—even though in a smaller degree of quantity—for the heat currant sectors 28b each located on both sides of the said heat current sectors 28a and related to the heat current sectors 28d located on both sides of the center plane 25. Reversely, the necessary specific heating capacity in the vicinity of the heat current sectors 28c guided along the edges 30 of the housing 1 is relatively small because of the large outer surface sections 27c associated to the heat current sectors 28c.

Figure 3:
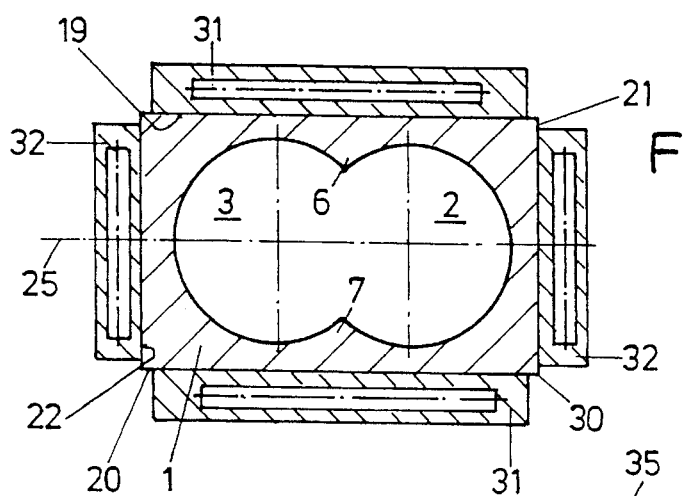
FIG. 3 shows a cross-section through the screw-type extrusion machine with heating plates in a first form of embodiment.
Figure 4:
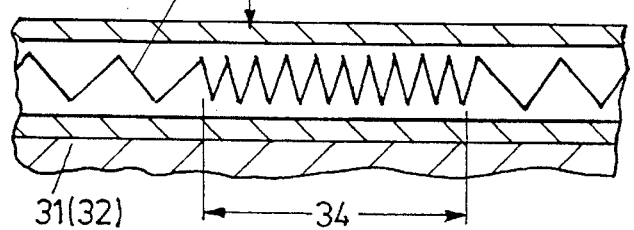
FIG. 4 shows a partial cross-section through the heating plates according to FIG. 3.

In FIG. 3 and 4 a form of embodiment is illustrated, in which heating plates 31, 32 are arranged on the outer stirfaces 19, 20, 21, 22 of the housing 1, the heating plates 31, 32 having electrical resistance heating elements 33 in their interior, which have a different resistance along their length—as can be seen in FIG. 4—and thus have a different heating capacity along their length. In FIG. 4 an area 34 of an increased heating capacity is outlined by a correspondingly close illustration of the heating coils 35 of the heating element 33. All heating plates 31 or 32 have a corresponding construction, so, that in the vicinity of the saddles 6 or 7 respectively in the vicinity of the center plane 25 an increased specific heating capacity compared to the area of the edges 30 is applied on the housing 1.

Figure 5:
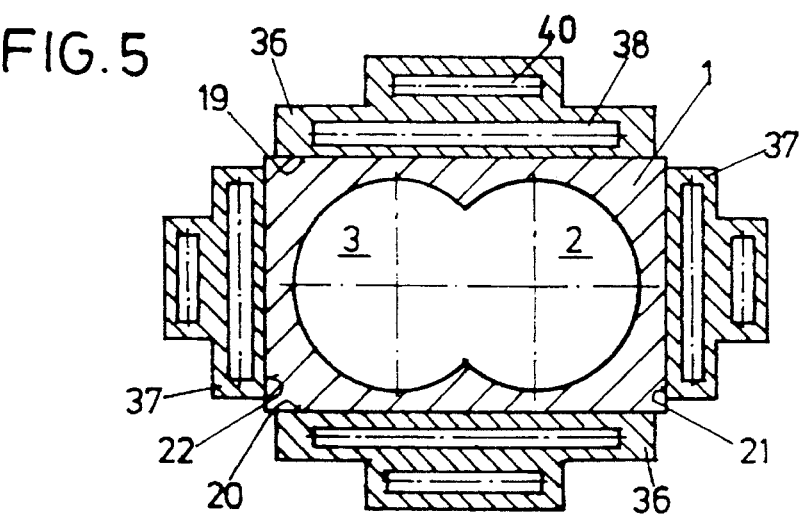
FIG. 5 shows a cross-section through the screw-type extrusion machine with a second form of embodiment of heating plates.
Figure 6:
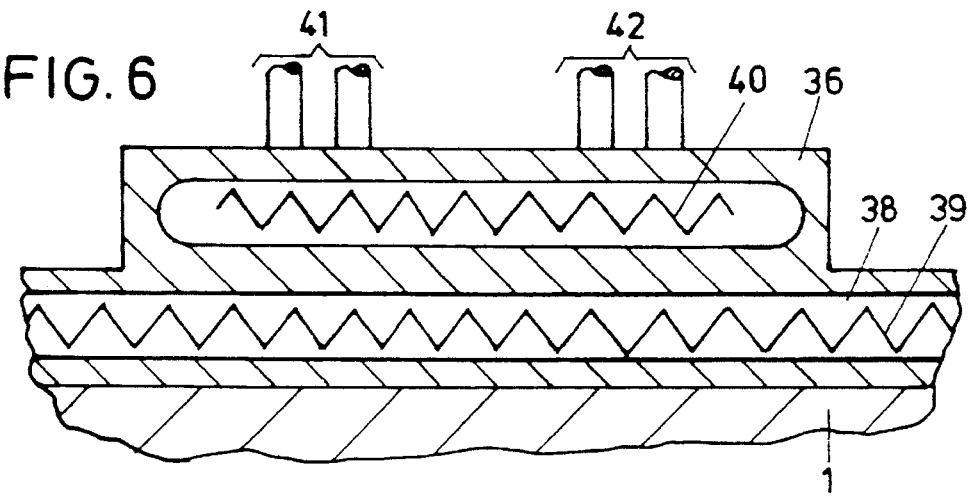
FIG. 6 shows a partial cross-section through the heating plates according to FIG. 5.

An alternative form of embodiment is illustrated in FIG. 5 and 6. In this case in turn heating plates 36, 37 are arranged at the outer surfaces 19 to 22 of the housing 1, the heating plates 36, 37 being essentially provided along their full cross-sectional width with electrical resistance heating elements 38, which have a constant electrical resistance along their full length and thus also release a constant specific heating capacity along their full length, what is illustrated in FIG. 6 by a constant closeness of the heating coils 39 along the length. In the area of an increased specific heating capacity additional heating elements 40 are provided in like manner in the stack with the heating elements 38, these additional heating elements 40 having also a constant specific heating capacity along the length. The heating elements 38 and 40 can be separately applied to voltage, as it is outlined in FIG. 6 by the corresponding electrical connections 41 or 42.

Figure 7:
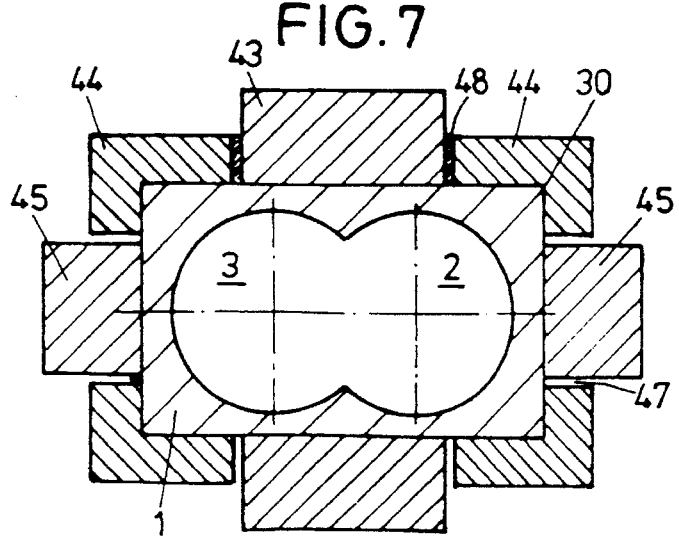
FIG. 7 shows a cross-section through the screw-type extrusion machine with a third form of embodiment of heating plates.
Figure 8:
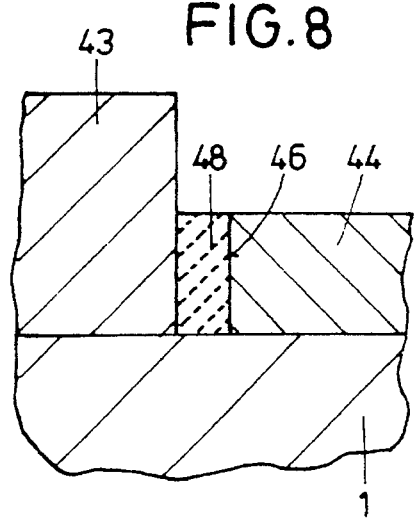
FIG. 8 shows a partial section of FIG. 7.

In order to attain a more accurate canalization of the heat flow, i.e. a canalization of the individual heat currents through the heat current sectors 28a to 28d illustrated in FIG. 2, in this case heating plates 43, 44, 45 can be arranged separately from each other in the outer surface sections 27a and 27b, in the outer surface sections 27c running along the edges 30 and in the outer surface sections 27d positioned in the vicinity of the center plane 25, according to the illustration in FIG. 7 and 8, the heating plates 44 running along the edges 30, and thus being angle-shaped. It is outlined by the different thickness of the heating plates 43, 44, 45 that they have different specific heating capacities, whether in the embodiment according to FIG. 4 or in the embodiment according to FIG. 6. The individual heating plates 43, 44, 45 are each separated from each other by a gap 46 or 47, and these gaps—as outlined in gap 46—can be filled with insulating material 48 such as fiber glass, rock wool or the like, or these gaps—as outlined in gap 47—can be formed as an air gap.

Figure 9:
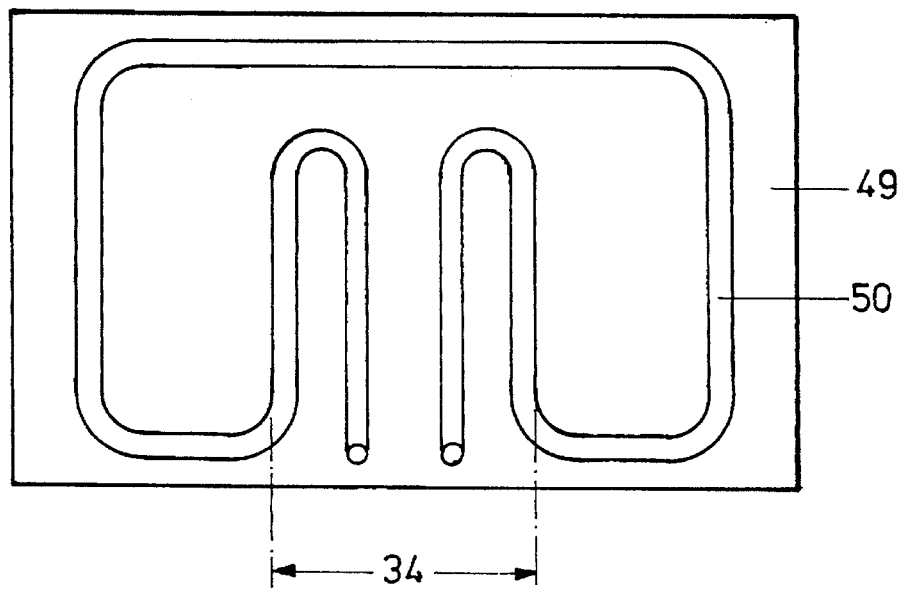
FIG. 9 shows a plan view on a fourth form of embodiment of a heating plate and FIG. 10 shows a partial longitudinal section through a modified example of embodiment of a housing with heating plates.

A simplified form of embodiment, compared to the forms of embodiment according to FIG. 3, 4 or 5, 6 or 7, 8, is illustrated in FIG. 9. In this case a heating plate 49 is provided, in which an electrical resistance heating element 50 is arranged with a constant resistance along its length and thus with a constant specific heating capacity along its length. An increased specific heating capacity of the heating plate is attained in an area 34 of an increased heating capacity by a differently close arrangement of the heating element in the surface of the heating plate 49. This embodiment is primarily useful, if the heating capacity which is to be transferred as a whole to the housing 1 is relatively low.

Figure 10:
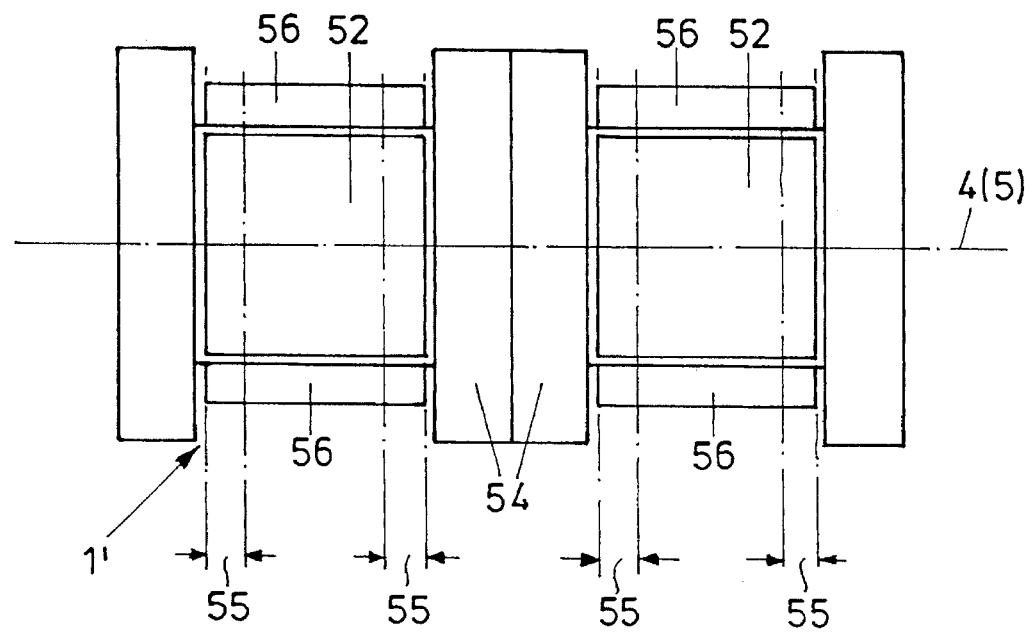

In FIG. 10 it is outlined, that the different specific heating capacity is not only of use along the circumference of the housing 1 related to its cross-section, but also in longitudinal direction of the housing 1, i.e. in the direction of the axes 4, 5. If—as is often usual in practical operation—a housing 1' consists of individual housing sections, of which two housing sections 52, 53 are outlined, which are connected by means of flanges 54, it is not possible to provide heating plates in the vicinity of this flange 54 because of constructive reasons. On this occasion, adjacent to the flanges 54, areas of an increased specific heating requirement are created, to which areas 55 of an increased heating capacity are associated. For the heating plates 56 provided in this case, the aforementioned measures are taken, in order to meet the increased heating requirement in this area.

The aforementioned measures described in particular in connection with FIG. 3 to 9 are applicable in like manner with single-shaft screw-type extrusion machines, if their housing has a non-circular outer cross-section, i.e. for example a quadratic cross-section. Furthermore these measures are applicable with multiple-shaft screw-type extrusion machines with a circular outer cross-section, since with multiple-shaft screw-type extrusion machines the bores as a whole do not have a circular cross-section which runs concentrically to the outer cross-section.

What is claimed is:

1. A screw-type extrusion machine comprising a housing (1,1')

two housing bores (2,3), which intersect each other forming saddles (6,7) and in each of which a shaft (8) is arranged which is provided with screw elements (10, 15) at least along a part of its length and which have walls (23,24), four outer surfaces (19 or 22) of the housing (1,1') arranged in rectangular cross-section and having a non-constant distance to the walls (23,24) of the bores (2,3), heating plates containing electrical resistance heating elements (33, 38, 40, 50) and arranged on said outer surfaces (19 to 22), wherein said heating plates are sectionally arranged on said outer surfaces (19 to 22) of the housing (1, 1') and are formed to heat said outer surfaces such that the heating temperature at the walls (23, 24) of the bores (2, 3) is approximately constant along their circumference.

2. A screw-type extrusion machine according to claim 1, wherein a portion of said electrical resistance heating elements (50) are arranged to provide an area having an increased heating capacity than another area.

3. A screw-type extrusion machining according to claim 1, wherein the heating plates are provided with heating coils (35) with a different electrical resistance along their length.

4. A screw-type extrusion machine according to claim 1, wherein said housing has adjacent outer surface sections and heating plates of adjacent outer surfaces sections are separated from each other.

5. A screw-type extrusion machine according to claim 4, wherein the heating plates are separated from each other by an insulating material (48).

6. A screw-type extrusion machine according to claim 4, wherein the heating plates are separated from each other by air gaps (47).

7. A screw-type extrusion machine comprising:

a housing (1, 1')

two housing bores (2, 3) which intersect each other forming saddles (6, 7) and in each of which a shaft (8) is arranged which is provided with screw elements (10, 15) at least along a part of its length, and which have walls (23, 24), four outer surfaces (19 to 22) of the housing (1, 1') arranged in rectangular cross-section and having a non-constant distance to the walls (23, 24) of the bores (2, 3), said four outer surfaces (19 to 22) each being partitioned into partitioned outer surface sections, heating plates containing electrical resistance heating elements (33, 38, 40, 50) and arranged on said outer surfaces (19 to 22), wherein said heating plates are sectionally arranged on said outer surfaces (19 to 22) of the housing (1, 1') and are formed to heat said outer surfaces with specific heating capacity for each partitioned outer surface section, said specific heating capacity is constant within each partitioned outer surface section and different from one partitioned outer surface section to an adjacent partitioned outer surface section such that the heating temperature at the walls (23, 24) of the bores (2, 3) is approximately constant along their circumference.

8. A screw-type extrusion machine according to claim 7, wherein said partitioned outer surface sections pro. de adjacent outer surface sections, and heating plates of adjacent outer surfaces sections are separated from each other.

9. A screw-type extrusion machine comprising a housing (1, 1')

two housing bores (2, 3), which intersect each other forming saddles (6, 7) and in each of which a shaft (8) is arranged which is provided with screw elements (10, 15) at least along a part of its length, and which have walls (23, 24), four outer surfaces (19 to 22) of the housing (1, 1') arranged in rectangular cross-section and having a non-constant distance to the walls (23, 24) of the bores (2, 3), heating plates containing electrical resistance heating elements (33, 38, 40, 50) and arranged on said outer surfaces (19 to 22), wherein said heating plates are sectionally arranged on said outer surfaces (19 to 22) of the housing (1, 1'), and are formed to heat said outer surfaces with different specific heating capacity per surfaces unit of said outer surfaces such that the heating temperature at the walls (23, 24) of the bores (2,3) is approximately constant along their circumference and wherein heating plates are arranged in a stack to form an area of an increased heating capacity (34).

10. A screw-type extrusion machine according to claim 9, wherein said housing has adjacent outer surface sections, and heating plates of adjacent outer surfaces sections are separated from each other.

* * * * *

UNITED STATES PATENT AND TRADEMARK OFFICE
CERTIFICATE OF CORRECTION

PATENT NO. : 5,549,383
DATED : August 27, 1996
INVENTOR(S) : Arno Knoll, Gerhard Weihrich, and Hans Wobbe It is certified that error appears in the above-indentified patent and that said Letters Patent is hereby corrected as shown below:

Column 5, Line 59, delete "or" and insert --to--.

Column 6, Line 1, after "outer surfaces" insert --with different specific heating capacity per surface unit of said outer surfaces--.

Column 6, Line 10, delete "length" and insert --lengths--.

Column 6, Line 50, delete "pro. de" and insert --provide--.

Column 7, Line 5, delete "surfaces" and insert surface--.

Signed and Sealed this

Eighteenth Day of February, 1997

Attest:

BRUCE LEHMAN

*Attesting Officer*  *Commissioner of Patents and Trademarks*